United States Patent [19]

Fleming et al.

[11] Patent Number: 5,667,557
[45] Date of Patent: *Sep. 16, 1997

[54] HYDROMETALLURGICAL EXTRACTION AND RECOVERY OF COPPER, GOLD, AND SILVER VIA CYANIDATION AND ELECTROWINNING

[75] Inventors: Christopher Andrew Fleming, Peterborough, Canada; Walther G. Grot, Chadds Ford, Pa.; John Anton Thorpe, Germanton, Tenn.

[73] Assignee: E. I. Du Pont de Nemours and Company, Wilmington, Del.

[*] Notice: The term of this patent shall not extend beyond the expiration date of Pat. No. 5,411,575.

[21] Appl. No.: 533,984

[22] Filed: Sep. 26, 1995

Related U.S. Application Data

[63] Continuation-in-part of Ser. No. 376,367, Jan. 23, 1995, abandoned, which is a continuation-in-part of Ser. No. 217,912, Mar. 25, 1994, Pat. No. 5,411,575.

[51] Int. Cl.$^6$ .............. C22B 3/12; C22B 3/20; C22B 11/08; C22B 15/14
[52] U.S. Cl. .............. 75/729; 75/735; 75/737; 423/29
[58] Field of Search .............. 75/373, 429, 729, 75/737, 735; 423/29, 150.6; 205/291, 292, 293, 295

[56] References Cited

U.S. PATENT DOCUMENTS 3,463,710 8/1969 Lower .............. 204/106
5,411,575 5/1995 Fleming et al. .............. 75/743

OTHER PUBLICATIONS

F.H. Chapman "Electrolysis", SME Mineral Processing Handbook, v. 2, N.L. Weiss ed., American Institute of Mining, Metallurgical, and Petroleum Engineers, Inc., New York, pp. 13-59—13-67 1985.

Scerescini, B. "The Mt. Gibson Process". AMMTEC Pty Ltd. Processing of Gold-Copper Ores (Practical Aspects): Jul. 4, 1991, pp. 39-41.

LaBrooy, S.R. "Copper-Gold Ore Treatment Options and Status" Randol Gold Forum Vancouver '92, Randol International: Golden, Co. pp. 173-177.

Muir, D.M., LaBroy, S.R., Fenton, K.. "Processing Copper-Gold Ores with Ammonia or Ammonia-Cyanide Solutions". World Gold '91, Australia. pp. 145-150.

*Primary Examiner*—David A. Simmons
*Assistant Examiner*—J. A. Lorengo
*Attorney, Agent, or Firm*—George A. Frank

[57] ABSTRACT

A hydrometallurgical process for treating copper feed materials containing gold and/or silver by simultaneously leaching copper, gold and/or silver into an aqueous cyanide solution, recovering copper in metallic form by electrowinning and regenerating cyanide ions is provided, wherein high current efficiencies are achieved at high current densities and at low copper concentrations.

11 Claims, 1 Drawing Sheet

5,667,557

HYDROMETALLURGICAL EXTRACTION AND RECOVERY OF COPPER, GOLD, AND SILVER VIA CYANIDATION AND ELECTROWINNING

CROSS REFERENCE TO RELATED APPLICATIONS

This application is a continuation-in-part of application, Ser. No. 08/376,367, filed Jan. 23, 1995, now abandoned which was a continuation-in-part of Ser. No. 08/217,912, filed Mar. 25, 1994, now U.S. Pat. No. 5,411,575.

FIELD OF THE INVENTION

This invention is related to hydrometallurgical extraction processes and specifically to the extraction of copper either alone or in the presence of gold from processed ore by cyanide leaching to provide gold and copper or mixtures thereof for the metal purification step of the overall metallurgical process.

BACKGROUND ART

There are three major identifiable steps that follow the mining step in the process of obtaining pure metals and/or minerals from rock or ore. These three steps of the overall metallurgical process are mineral processing, metallurgical extraction and metal purification. Mineral processing itself is broken down into one of two steps: comminution and concentration. Metallurgical extraction can be either o hydrometallurgical or pyrometallurgical while metal purification includes smelting, electrowinning or electrorefining of the product coming from the metallurgical extraction steps.

Gold ores containing high concentrations of cyanide-soluble copper minerals, e.g., chalcocite ($Cu_2S$), bornite ($FeS \cdot 2Cu_2S \cdot CuS$), malachite [$CuCO_3 \cdot Cu(OH)_2$], azurite [$2CuCO_3 \cdot Cu(OH)_2$], covellite (CuS) and cuprite ($Cu_2O$), have traditionally been difficult to treat economically, because of the high costs associated with cyanide consumption during leaching and cyanide destruction during effluent treatment. High concentrations of copper cyanide in the leach liquor can also cause a variety of metallurgical problems, whether gold is recovered by the Merrill-Crowe process, or by adsorption on activated carbon. Consequently, many gold resources that fall into this category are still lying in the ground, awaiting the development of adequate technology for their treatment.

Much research has gone into this problem over the years, and these efforts have generally focused in one of two directions: to develop other leaching chemistries for gold dissolution, i.e., lixiviants that are more selective than cyanide for gold over copper or to suppress the reaction between copper and cyanide by either physically or chemically masking the copper minerals. Neither approach has met with widespread success. This invention provides an efficient and cost effective process for treating gold ores containing high concentrations of cyanide-soluble copper minerals, as well as high copper bearing ores with negligible gold.

Hydrometallurgical extraction of copper and gold has been carried out previously by leaching the ore first with sulfuric acid to dissolve the copper minerals, followed by neutralization of the residual acid and finally by cyanidation to leach the gold. This approach does not work with the sulfide minerals such as chalcocite and bornite, which leach in cyanide solution but not in acid, is often uneconomic due to high acid, base or cyanide consumption, and prolonged leaching times required for two stages of leaching, and is often impractical because of physical changes brought about in the rock by acid treatment. An alternative approach is to leach with cyanide as described in U.S. Pat. No. 3,463,710. This patent discloses an aqueous alkaline cyanide leaching of copper ores followed by electrolyzing the separated solution to recover only a portion of the copper and recovering cyanide. This process, however, suffers from certain limitations; it utilizes low current density, requires high copper concentrations and leads to the oxidation of cyanide at the anode.

There is a need for a process for treating copper-bearing ores or concentrates containing gold by simultaneously leaching both metals, gold and copper, into an aqueous cyanide solution, recovering copper and gold in metallic form and regenerating cyanide ions in an economically efficient process wherein copper is recovered from dilute solutions at high current densities with minimal cyanide oxidation.

SUMMARY OF THE INVENTION

The process of this invention is a hydrometallurgical extraction process for treating ores, concentrates and alternative feed materials containing copper alone or combinations of gold, silver and copper comprising the steps of:

(a) treating said ores, concentrates or feed materials with an aqueous cyanide solution having a molar ratio of CN:Cu of >3:1 thereby simultaneously leaching copper, gold and silver; and (b) removing and recovering copper from the solution resulting from step (a) by an electrowinning process in an electrowinning cell wherein high current efficiencies are achieved at high current densities and at low copper concentrations by (i) passing the solution as the electrolyte (catholyte) through a compartment containing the cathode(s) with a high rate of flow of the catholyte, wherein the cathode has high surface area, and wherein the CN:Cu molar ratio of the catholyte is $\leq 4.5:1$;

(ii) electrodepositing copper metal on the surface of the cathode(s) in the cell wherein oxidation of cyanide ions at the anode is diminished; and (iii) recovering the copper from the cathode(s) by electrorefining or by smelting.

Alternatively, when copper concentrations are above approximately 10 g/l, high current efficiencies can be achieved at high current densities utilizing sheet cathodes even in catholyte solutions having a CN:Cu molar ratio exceeding 4.5:1.

Gold and/or silver can be recovered at various points in the hydrometallurgical extraction process of this invention.

DETAILED DESCRIPTION OF THE INVENTION

Figure 1:
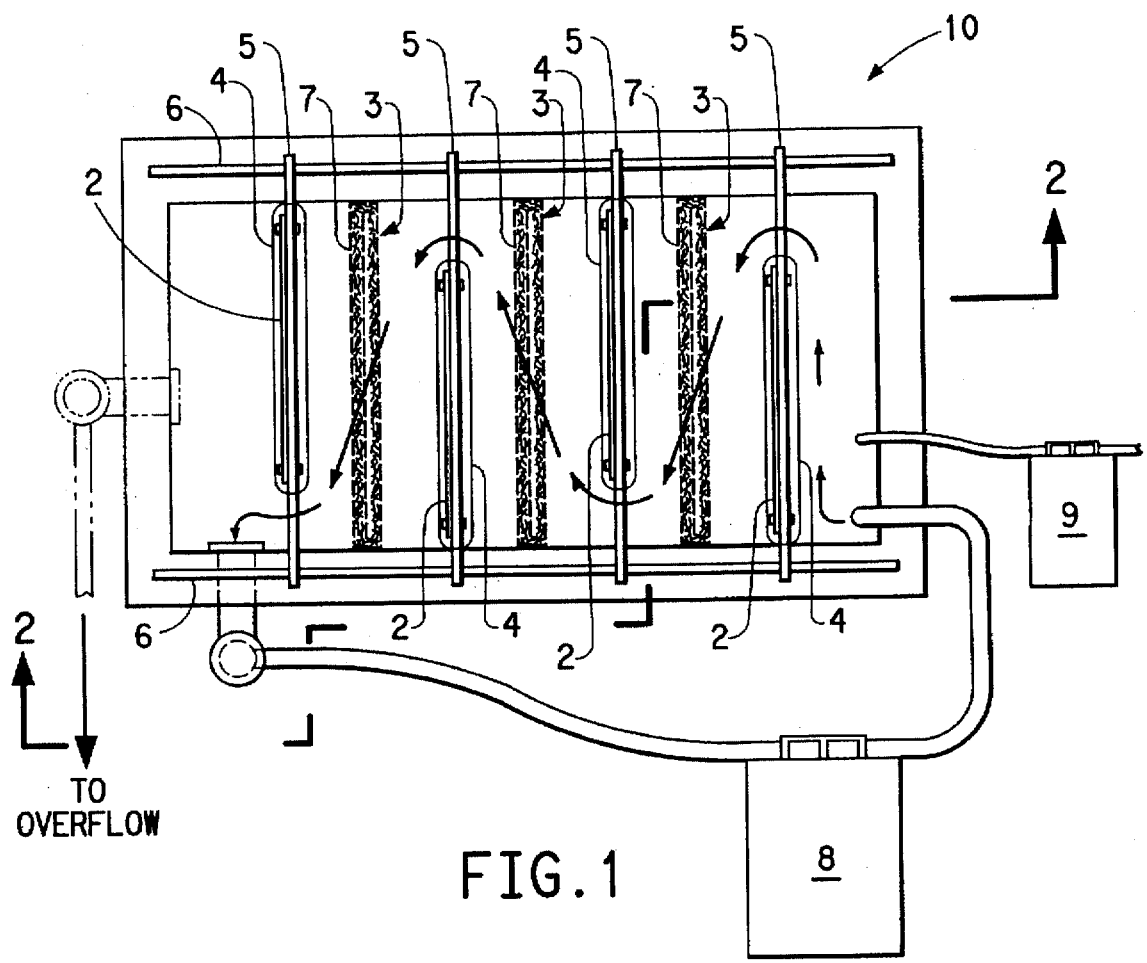
FIG. 1 is a plan view of a 20-liter electrowinning cell.
Figure 2:
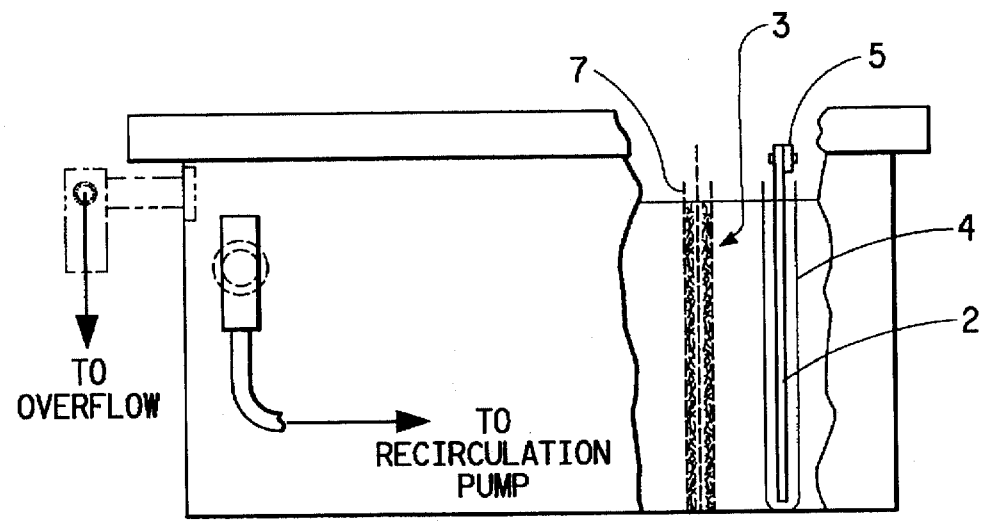
FIG. 2 is a partial section taken at line 2—2 of FIG. 1.

The process of this invention can be broadly described as treating copper ores or concentrates optionally containing gold and/or silver or any other materials containing copper alone or copper with gold and/or silver (hereinafter collectively referred to as copper feed materials or feed materials) in a hydrometallurgical process by simultaneously leaching copper, gold and/or silver into an aqueous cyanide solution, recovering copper, gold and/or silver in metallic form and regenerating CN⁻ ions. This process is capable of recovering gold, silver and copper from feed materials containing low concentrations of these metals and, therefore, can help eliminate the flotation step in the conventional process for treating sulfidic copper and copper/gold/silver ores. (References to gold hereafter can mean gold and/or silver.)

Copper is recovered directly by electrowinning from a solution containing copper cyanide as described below. Electrowinning is defined as the deposition of a metal on a cathode from a solution of the metal in the form of a metal salt.

To obtain high leaching efficiency for both copper and gold there is a process of this invention of leaching feed materials with a cyanide solution (having a CN:Cu ratio of >3).

CN:Cu ratio is defined as the number of moles of (CN)⁻ complexed with each mole of Cu⁺ in a solution plus the number of free (CN)⁻ ions not complexed with another metal or hydrogen ion per mole of Cu⁺ in the solution.

One approach to obtaining gold from a pregnant leach solution is by cementation of gold on copper metal comprising the steps of:

(a) contacting a solution containing gold cyanide and copper cyanide wherein the CN:Cu ratio is not less than 3.5:1 with either copper metal powder or copper metal which has been electrodeposited on a high surface area cathode thereby producing a cemented product of gold metal on copper metal; and (b) recovering gold from the cemented product by electrorefining or smelting.

A process for preparing a solution useful in the recovery of copper comprises the steps of:

(a) contacting a pregnant leach solution (with or without gold present) with unleached coarse or finely ground feed materials thereby reducing the CN:Cu ratio; and (b) separating the resulting solution from the partially leached feed material thereby producing a solution suitable for recovery of copper and a leached feed material from which copper has been partially leached.

This feed material which results from the above process, then is returned to the process described initially wherein the feed material (containing copper and gold) is leached with a cyanide solution such that the molar ratio of cyanide to copper in the pregnant leach solution is not less than 3:1.

After the leaching steps described above, the hydrometallurgical extraction processes of this invention are applied to the recovery processes for copper and optionally gold and to purge unwanted species from solution.

The process for the direct recovery of copper by electrowinning from a solution containing copper cyanide (and optionally containing gold) prepared by the above described processes (utilizing an aqueous cyanide solution having a molar ratio of CN:Cu of >3:1) is one wherein high current efficiencies are achieved at high current densities and at low copper concentrations and comprises the steps of:

(a) passing the solution as the electrolyte (catholyte) through a compartment containing the cathode(s) with a high rate of flow of the catholyte, wherein the cathode has high surface area, and wherein the CN:Cu molar ratio of the catholyte is <4.5:1;

(b) electrodepositing copper metal on the surface of the cathode(s) in an electrowinning cell wherein oxidation of cyanide ions at the anode is diminished; and (c) recovering the copper from the cathode(s) by electrorefining or by smelting.

Preferably, this process is carried out under conditions where the catholyte contains additives capable of diminishing hydrogen formation at the cathode surface, Alternatively, when copper concentrations are above approximately 10 g/l, high current efficiencies can be achieved at high current densities utilizing sheet cathodes even in catholyte solutions having a CN:Cu molar ratio exceeding 4.5:1.

High current density is defined as being in the range of >100 amps/square meter of wetted superficial cross-sectional area of the cathode.

By high surface area cathode is meant a cathode whose wetted surface area is at least ten times greater than the superficial cross-sectional area of the cathode.

High rate of flow of the catholyte is attained either by internal recirculation of catholyte or by appropriately arranging cathodes or cells in series such that the linear flow of catholyte across the surface of the cathode is at least 2 meters/min.

Low copper concentrations of a pregnant leach solution are deemed to be <10 g of copper/liter of solution.

In carrying out this process, it was found that, during the electrowinning step there was a need for a high rate of flow of the catholyte. It is believed that this enhances the mass transfer rate of copper cyanide complex ions to the cathode surface and cyanide ions from the cathode surface such that the reduction of water at the cathode surface is minimized.

To achieve successful direct electrowinning of copper in the process of this invention, one needs to utilize a cathode of high surface area. This is believed to be necessary to reduce the effective current density at the cathode surface thereby achieving a more effective electrodeposition of copper (relative to reduction of water). Examples of high surface area cathodes are steel wool, stainless steel wool, stainless steel knitted mesh and aluminum wool.

The catholyte utilized can contain other moieties (ions and other materials either added to the catholyte or accumulating in the catholyte through their formation in the leaching step of the process, collectively, additives) capable of diminishing hydrogen formation at the cathode surface. These additives are generally utilized at CN:Cu ratios exceeding 3. The reason for their use is that at CN:Cu molar ratios above about 3.5 (the exact value depends on pH and Cu concentration), $H_2$ evolution is thermodynamically favored, i.e., requires a potential less negative than that for Cu deposition.

The additives interfere with the kinetics of $H_2$ evolution by blocking/poisoning catalytic sites. Examples of such additives that had been found to be effective include sulfide, thiocyanate, thiourea, benzothiazole, 1-methylimidazol, thiosulfate and isonicotinic acid. Concentration of such moieties can range from 10–10,000 ppm in the catholyte.

In order to carry out the process of this invention economically and to be able to recover cyanide ions, one needs to keep their oxidation at the anode to a minimum. This can be done by isolating the catholyte from the anode by a cation exchange membrane, by restricting the flow of catholyte to the anode by means of a diaphragm or by using as the anode a hydrogen-gas diffusion electrode wherein $H_2$ is provided and consumed in the anodic reaction.

A preferred cation exchange membrane is Nafion® perfluorosulfonic acid membrane (a registered trademark of E. I. du Pont de Nemours and Company).

The above direct copper recovery process can be carried out in such a way that the electrolyte in the anode compartment (anolyte) is maintained at a pH >7 by the addition of a base or basic salt thereby preventing the build-up of $H^+$ ions in the anode compartment. Such base or basic salt can be sodium hydroxide or sodium carbonate. Preventing the build-up of $H^+$ ions prevents the migration of such $H^+$ ions through the membrane thereby avoiding the formation of HCN in the catholyte.

As an alternative to the above copper recovery process, the anode compartments can be filled with a dilute mineral acid such as sulfuric acid or with a salt such as sodium sulfate, allowing $H^+$ ions to form at the anodes and migrate to the catholyte. Any HCN formed can be left in the catholyte solution to lower the free cyanide ion concentration thereby permitting more efficient cell operation or can be converted to cyanide ion by the addition of alkali to the catholyte or the cell effluent or removed from the catholyte or cell effluent and converted to cyanide ion for use. Formation of HCN can be prevented by maintaining the catholyte pH high (>10.5) at all points in the cell or can be promoted by the addition of an acid.

Other refinements of the above copper recovery process can minimize anodic cyanide oxidation by using unprotected anodes and allowing $(SCN)^-$ to oxidize at the anodes thus reducing the oxidation of cyanide ions and by using diaphragms to minimize mass transfer at the anodes thereby starving the anodes for cyanide ion and minimizing cyanide oxidation. The achievement of high cathodic (copper) current efficiencies can also diminish the relative amount of cyanide ion oxidized at unprotected anodes; thus the use of membranes or diaphragms can be avoided in some applications.

A further refinement of the above copper recovery process involves the heating of the catholyte solution thereby increasing the current efficiency for the electrodeposition of copper. A preferred temperature range is 50–100° C.

An alternative approach to achieve increased mass transfer of copper ions to the cathode surface and $CN^-$ from the cathode surface is the introduction of a stream of gas such as air or nitrogen to increase turbulence at the cathode surface.

The electrowinning process can be enhanced by the build-up of salt concentration in the catholyte. This build-up occurs whenever the catholyte is recycled to the leaching process but is necessarily limited by the requirements of the leaching process.

In certain applications it can be advantageous to operate with several electrowinning cells in series. The operating conditions in some or all of these cells can be different to achieve overall optimum performance. For example, the upstream cells in the series can be operated with sheet cathodes and/or relatively high current densities while the downstream cells can be operated with high surface area cathodes and/or relatively low current densities.

In the process of the direct recovery of copper by electrowinning from a solution containing copper cyanide and gold cyanide, it has been found that gold co-deposits with copper at the cathode. The efficiency of gold deposition has been shown to be significantly higher than the efficiency of copper deposition and, therefore, often this method will be preferred for recovering gold. For example, under certain cell operating conditions in which approx. 25% of the copper in the pregnant leach solution is extracted in the electrowinning, approx. 60–80% of the gold will be extracted.

Gold can be recovered as anode sludge during electrorefining of the copper.

An alternative to the above direct metal recovery mode of recovering copper from a solution in the copper recovery process is a process for the recovery of copper from a solution containing copper cyanide at a CN:Cu ratio of <3:1 (optionally containing gold) whereby the copper is preconcentrated by adsorption on a strong base or weak base anion exchange resin comprising the steps of:

(a) contacting the solution with an anion exchange resin thereby selectively adsorbing copper cyanide at a CN:Cu ratio of <3:1 onto the resin wherein gold, if present, is adsorbed to a limited equilibrium level (an insignificant portion of the gold present in the solution) which does not interfere with the adsorption of copper;

(b) separating the resin having copper cyanide adsorbed thereon from the now partially depleted solution containing copper cyanide at a CN:Cu ratio of >3;

(c) treating the loaded resin obtained in step (b) above with an eluant containing copper cyanide at CN:Cu ratios of >3.5:1 and a copper concentration of at least 10 grams/liter (this copper concentration being such that the subsequent electrowinning step can be operated at a maximum current efficiency) thereby eluting copper cyanide from the resin to the extent of approximately 50% of the copper on the resin and producing an eluate solution having a CN:Cu ratio of less than 4:1; and (d) electrowinning copper metal from the eluate produced in step (c) above by the process of this invention described above for the recovery of copper.

Yet another alternative process for the recovery of copper is a process analogous to the recovery of copper by preconcentration on an anion exchange resin wherein a strong base or a weak base anion exchange solvent is utilized instead of an anion exchange resin. These solvents include tertiary amines or quaternary ammonium hydroxides.

Copper so obtained by the hydrometallurgical extraction processes of this invention is now ready for the elution and electrowinning steps to complete the overall metallurgical process.

The following process allows the recovery of gold. Such process allows the recovery of gold from gold cyanide complex which is present in the solution produced when gold was optionally present. This process for recovering gold from gold cyanide complex adsorbed on an anion exchange resin or solvent, resulting from a contact between a solution containing gold cyanide complex and an anion exchange resin or solvent, comprises the steps of:

(a) contacting the loaded resin or solvent having gold cyanide complex and copper cyanide adsorbed thereon with an eluant solution containing copper cyanide at a CN:Cu ratio of approximately 4:1 and a copper concentration of approximately 20 to 40 grams per liter thereby eluting gold cyanide complex from the resin or solvent; and (b) removing gold metal from the eluate by cementation on copper metal powder or copper plated onto a high surface area substrate or by electrowinning.

One preferred method for application of direct metal recovery is to a heap or dump leach. The pregnant solution, containing copper and gold, is passed in total through electrowinning cells, and then returned to the barrens pond for reuse in leaching. This mode of operation keeps average CN:Cu ratios at a low level in the cells thereby enhancing electrowinning efficiency. Copper extraction from the pregnant solution can be in the 10–30% (wt.) range extraction per pass and gold extraction (co-deposition with copper) is expected to be in the 50–80% range per pass.

Copper and gold can be electrowon on stainless steel cathodes which become anodes for the electrorefining step.

Carbon can be used to remove substantially all $Au(CN)_2^-$ from the barrens (solution downstream of electrowinning) or the process can be run without using carbon. Without carbon, gold concentrations in the pregnant solution can increase up to twice that expected for a process using carbon.

The following process allows for the purging of unwanted moieties ($OCN-$, $SCN-$, $Cl-$, $SO_4 2-$, $Fe(CN)^{4-}_6$, $Zn(CN)^{2-}_4$, etc.) while retaining gold, copper and cyanide, and comprises the steps of:

(a) contacting a bleed stream of solution containing gold cyanide and copper cyanide and various unwanted ions with metallic copper to reduce the CN:Cu ratio to <3:1 and subsequently with activated carbon, thereby selectively adsorbing gold cyanide and copper cyanide onto the activated carbon;

(b) separating the activated carbon having gold cyanide and copper cyanide adsorbed thereon from the now gold, copper and cyanide depleted leach solution containing the unwanted ions;

(c) treating the activated carbon having gold cyanide and copper cyanide adsorbed thereon with an aqueous cyanide solution at a temperature of not less than 100° C.; and (d) recycling the eluate solution to the leaching step in the process.

EXAMPLE

Recovery of Copper and Gold by Electrowinning

A 20-liter electrowinning cell, measuring 36 cm long, 25 cm wide and 26 cm high was set up and is shown in FIG. 1; the reference numbers below correspond to those shown in FIG. 1.

The cell 10 was operated with four anodes 2 alternating with three cathodes 3. The anodes were made of stainless steel (No. 316) plates. Each plate measured 26 cm high×20 cm wide and was mounted onto a copper hanger. The anode plate was inserted in a Nation® No. 417 cation-exchange membrane pouch 4 (an anode assembly), and the entire anode assembly was hung by means of hangers on two anode busbars 6 resting on top of the tank (cell). The Nation®pouch was approximately 25 cm high and 22 cm wide and contained 1 liter of 15% NaOH solution. During electrolysis, NaOH was added to each pouch at a rate of 1.49 g/amp/hr to compensate for the base consumed at the anode. The use of a Nation® pouch prevented the migration of anions such as $CN^-$ and $Cl^-$ to the anode surface, thereby avoiding oxidation of cyanide and corrosion of the anode material.

The cathodes were made of steel wool. Each steel wool cathode consisted of 25–100 g of steel wool No. 0 wrapped around a stainless steel screen core. The steel wool cathode was inserted in a perforated plastic basket 7 (23 cm high ×25 cm wide×6 cm thick) and the entire cathode assembly was placed in the cell resting on the cell bottom. The width of the plastic basket was the same as the width of the tank to prevent liquid flow bypassing the cathode basket. The superficial plating surface area was approximately 22 cm high×20 cm wide (440 $cm^2$), for each side of the 3 cathodes.

A high rate of flow was provided by pumping the solution from an overflow assembly to the front of the cell through a recirculating pump 8. Using steel wool cathodes, the anode assemblies were arranged so that the front edge of the first and third anode assemblies touched the front side of the cell and the back edge of the second and fourth anode assemblies touched the back side of the cell. This forced the recirculating solution to travel in a zigzag mode from one end of the cell, through the electrode set, to the other.

The feed solution, having pH of approximately 11.5 and containing 5950 mg/l of cyanide, 5000 mg/l of copper (mole ratio of CN:Cu=2.9), 0.94 mg/l gold, contained the following concentrations of ions (in mg/l): cyanate, 1736; thiocyanate, 1009; sulfate, 294; thiosulfate, <50; and sulfide, <10, was introduced into the cell through feed pump 9. Electrowinning was carried out with an average of 50 g of steel wool on each cathode, at an average voltage of 4.6 V and at a current density of 200 amp/$m^2$. In an electrowinning time of 6 hr, current efficiency was 82% (based both on solution assay and cathode weight percent) and power consumption was 2.4 kwh/kg copper. The results of the electrowinning process were 202 g of copper plated on the cathodes, 108 mg (calculated) gold plated on the cathodes at the extraction efficiency of 25% and 71%, respectively. The molar ratio of CN:Cu in the cell was 3.7.

What is claimed is:

1. A hydrometallurgical extraction process for treating copper feed materials comprising the steps of:

(a) treating said feed materials with an aqueous cyanide solution having a molar ratio of CN:Cu of >3 thereby simultaneously leaching copper, gold and/or silver;

(b) optionally removing and recovering substantially all gold or silver, if present, from the pregnant leach solution; and (c) removing and recovering copper from the solution resulting from step (b) by an electrowinning process in an electrowinning cell wherein high current efficiencies are achieved at high current densities and at low copper concentrations by (i) passing the solution as the electrolyte (catholyte) through a compartment containing the cathode(s) with a high rate of flow of the catholyte, wherein the cathode has high surface area, and wherein the CN:Cu molar ratio of the catholyte is ≦4.5:1;

(ii) electrodepositing copper metal on the surface of the cathode(s) in the cell wherein oxidation of cyanide ions at the anode is diminished; and (iii) recovering the copper from the cathode(s) by electrorefining or by smelting.

2. The process of claim 1 wherein the catholyte contains additives capable of diminishing hydrogen formation at the cathode surface.

3. A process for the direct recovery of copper by electrowinning in an electrowinning cell from a solution containing copper cyanide (and optionally containing gold or silver or both) wherein high current efficiencies are achieved at high current densities and at low copper concentrations comprising the steps of:

(a) passing the solution as the electrolyte (catholyte) through a compartment containing the cathode(s) with a high rate of flow of the catholyte, wherein the cathode has high surface area, and wherein the CN:Cu molar ratio of the catholyte is ≦4.5:1;

(b) electrodepositing copper metal on the surface of the cathode(s) in an electrowinning cell wherein oxidation of cyanide ions at the anode is diminished; and (c) recovering copper from the cathode(s) by electrorefining or by smelting.

4. The process of claim 3 wherein the catholyte contains additives capable of diminishing hydrogen formation at the cathode surface.

5. The process of claims 1 or 3, wherein gold or silver or both are electrodeposited and recovered along with copper.

6. The process of claim 3 wherein the anode(s) are kept isolated from the catholyte by a cation exchange membrane.

7. The process of claim 6 wherein the cation exchange membrane is a perfluorosulfonic acid-based membrane.

8. The process of claim 3 wherein the flow of catholyte to the anode is restricted by a diaphragm.

9. The process of claim 3 wherein the anode compartment is maintained at pH >7 by the addition of base or basic salt.

10. The process of claim 3 wherein $H^+$ ion concentration increases in the anolyte during the process and the ions migrate to the catholyte.

11. The process of claim 3 wherein the anode is a hydrogen gas diffusion electrode wherein $H_2$ is provided and consumed in the anodic reaction thereby preventing the oxidation of $CN^-$ ions at the anode.

* * * * *